United States Patent [19]
Poppe

[11] 3,939,235
[45] Feb. 17, 1976

[54] PROCESS FOR CONTINUOUS PRODUCTION OF THIN POLYURETHANE FOAM LAYERS

[75] Inventor: Willy F. Poppe, Sint-Niklaas, Belgium

[73] Assignee: Serpo, Sint-Niklaas, Belgium

[22] Filed: Mar. 19, 1974

[21] Appl. No.: 452,537

[30] Foreign Application Priority Data
Mar. 30, 1973  Belgium .............................. 797553

[52] U.S. Cl. ............... 264/46.6; 264/46.9; 264/54; 264/216; 264/309; 425/110; 425/817 C; 427/32; 427/42 X; 428/310; 428/320
[51] Int. Cl.² ......................................... B29D 27/04
[58] Field of Search ........ 264/45.8, 45.6, 46.5, 46.9, 264/54, 216, 309; 117/104 R, DIG. 7; 425/110, 817 C; 428/310, 320; 427/32, 421

[56] References Cited
UNITED STATES PATENTS

| | | | |
|---|---|---|---|
| 1,946,831 | 2/1934 | Bracewell | 117/104 R X |
| 1,970,227 | 8/1934 | Frisbie | 117/104 R UX |
| 2,753,276 | 7/1956 | Brochhagen et al. | 117/DIG. 7 |
| 2,754,227 | 7/1956 | Ransburg | 117/104 R X |
| 2,779,689 | 1/1957 | Reis | 117/DIG. 7 |
| 3,172,925 | 3/1965 | Preotle | 264/46.5 |
| 3,297,474 | 1/1967 | Shields | 117/104 R |
| 3,455,728 | 7/1969 | Kiwiet | 117/104 R X |
| 3,726,951 | 4/1973 | Smith | 264/46 |
| 3,797,981 | 3/1974 | Van Dijk | 264/45.8 X |

FOREIGN PATENTS OR APPLICATIONS

| | | | |
|---|---|---|---|
| 874,602 | 8/1961 | United Kingdom | 117/DIG. 7 |

*Primary Examiner*—Philip Anderson
*Attorney, Agent, or Firm*—Bacon & Thomas

[57] ABSTRACT

The invention pertains to a process for the continuous production of thin polyurethane foam layers, in which a band-like supporting layer is moved longitudinally and locally guided so as to take a nearly cylindrical shape, the axis of which is horizontal and perpendicular to the general direction of the band motion, and a reacting mixture is projected on the supporting layer by means of a vertical, rotating projection disk, reciprocating along the axis of the said cylindrical shape.

4 Claims, 5 Drawing Figures

PROCESS FOR CONTINUOUS PRODUCTION OF THIN POLYURETHANE FOAM LAYERS

The present invention relates to a process for continuous production of thin polyurethane foam layers. "Thin layers" are to be understood as foam layers having a thickness ranging from about two tenths of a millimeter to 25 millimeters.

There has been proposed a continuous process for producing foam layers through electrostatically or otherwise projecting a reacting mixture on a flat moving support layer, by means of one or more spray heads.

With this system, however, it is difficult to ensure a constant thickness of the foam layer, especially near the edges of the foam layer.

It has been found that the drawbacks of the known processes could be prevented by following a process, object of the invention, substantially comprising the steps of: longitudinally moving a band-like supporting layer and forcing it locally to take a nearly cylindrical shape, which has a horizontal axis, at right angles with the general direction in which the band is moving, and projecting a reacting mixture by means of a vertical rotating disk, reciprocating along the axis of the said cylindrical shape.

It should be noted that it has been proposed to line constructional panels made from plastic material with polyurethane foam, to move the said panels vertically around rotating, electrostatically charged projection disks, which are moving up and down. Such a method, however, cannot be applied without change for continuously producing thin foam layers as such;

The present invention also relates to a device for applying the new process defined above, as will be described in detail hereafter.

In order that the invention may be more readily understood, reference will now be made to the attached drawings in which.

Figure 1:
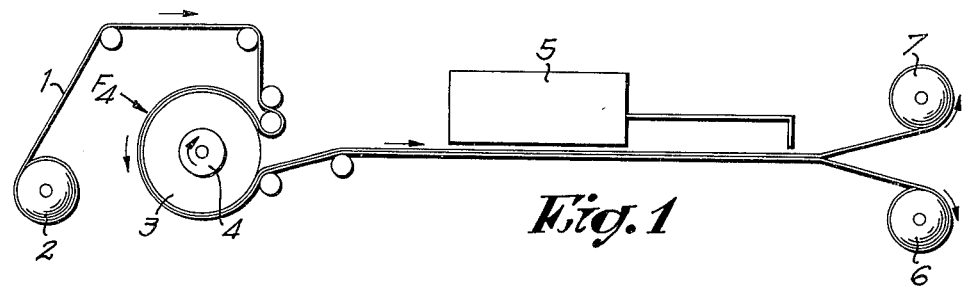
FIG. 1 shows a side view of a basic schematical drawing of the invention, respectively of the device according to the invention.

As shown in FIG. 1, the invention mainly relates to: moving a band-like supporting layer 1, reeled off in the present case from reel 2; locally guiding the supporting layer so that it takes a cylindrical shape 3, the axis of which is horizontal; and projecting a reacting mixture on the cylindrical surface of the supporting layer by means of a rotating disk 4, reciprocating along the axis of the said cylindrical shape.

The supporting layer with the polyurethane foam building-up layer applied thereon is horizontally conveyed farther, e.g. through a drying and curing oven 5. When leaving the latter, the supporting layer and foam layer are separated from each other and reeled on rolls, respectively 6 and 7.

Figure 2:
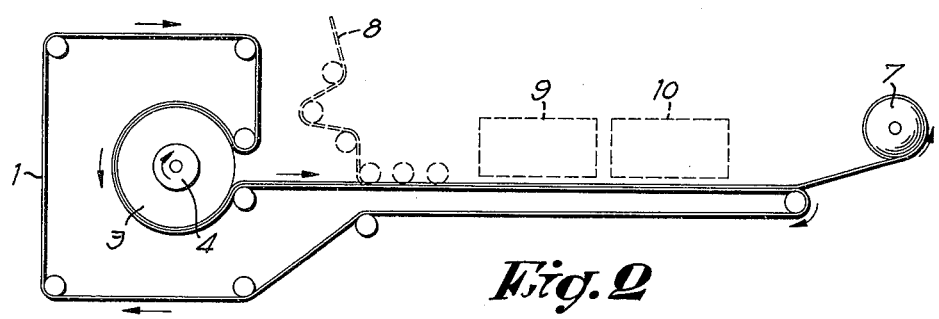
FIG. 2 shows another embodiment of the invention.

As illustrated in FIG. 2, the supporting layer may be an endless belt.

When the foam layer is built-up and while it is not hardened yet, various operations, which are known in themselves, may be performed. FIG. 2 shows in dotted lines, one of the many possibilities, e.g. bedding in of wire gauze 8, tufting by means of a tufting unit 9 and hardening in a curing oven 10. Thus, in this case, a reinforced polyurethane foam layer with pole deck is obtained.

Figure 3:
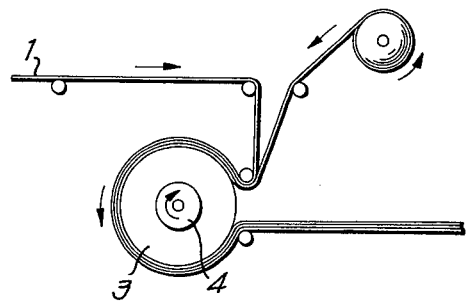
FIG. 3 shows a possible application of the device according to FIG. 2.

FIG. 3 illustrates a simple way for producing a foam layer backed with aluminium or plastic foil, fabric, felt, paper or a similar material.

Figure 5:
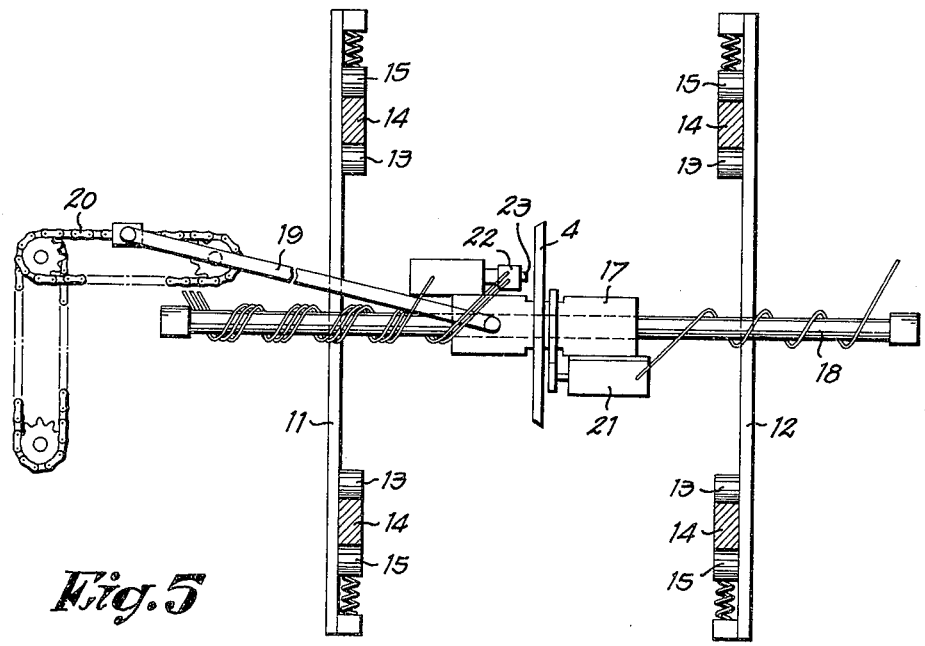
FIG. 5 shows a schematical front view of the projection disk and driving-gear.
Figure 4:
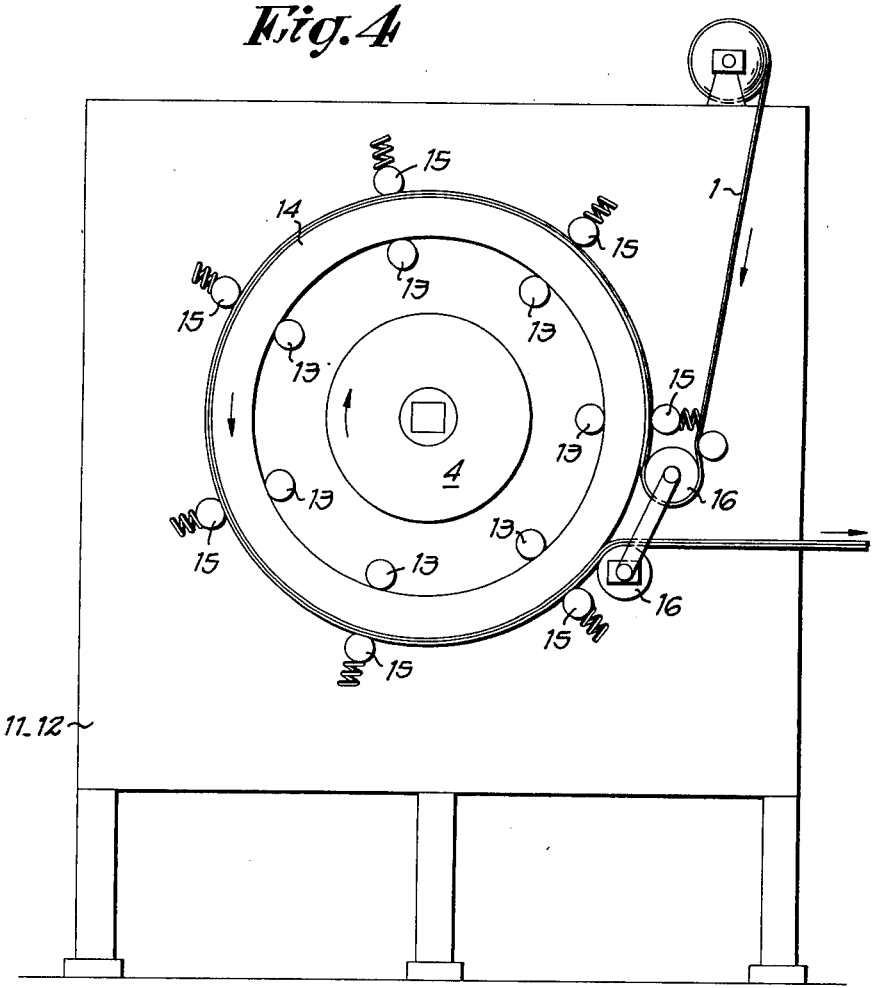
FIG. 4 shows on a larger scale a more detailed view of the part marked by the arrow F4 in FIG. 1.

Guiding the supporting layer into taking a cylindrical shape is possible by means of a comparatively simple device as illustrated in FIGS. 4 and 5.

Two parallel plates 11 and 12 are each supporting a number of small jockey-wheels 13, on and around which is mounted a ring 14. The edges of the supporting layer 1 run each on a ring 14 against which they are pressed by a small sprung wheels 15.

Drive-wheels 16 may also be provided if found suitable.

The projection disk 4 is rotatably mounted on a guide 17 enclosing a stationary rod 18 along which the guide is able to slide with a reciprocating motion controlled by a crank-pin and chain mechanism 19-20. The disk 4 is caused to rotate by a compressed air motor 21. Compressed air, polyol and isocyanate are conveyed to a mixing chamber 22, the outlet 24 of which is adjacent to the centre of the disk 4.

The arrangement described above is a mere example, which may be replaced by other equivalent means.

It goes without saying that the drives of the supporting layer 1, disk 4 and slide 17 are adjustable, as is also the component feed to the mixing chamber 22.

What I claim is:

1. Process for the continuous production of polyurethane foam layers comprising the steps of:
   a. moving a band-like supporting layer longitudinally;
   b. guiding said moving supporting layer at a particular location so as to form a section having a substantially cylindrical shape, the axis of said cylindrically shaped section being horizontal and being perpendicular to the direction of travel of said supporting layer;
   c. rotating a disk within said cylindrically shaped section of said moving supporting layer; and simultaneously
   d. projecting a foamable polyurethane reaction mixture on said moving supporting layer of said cylindrically shaped section; and simultaneously
   e. reciprocally moving said rotating disk first in one direction and then in the opposite direction along said axis.

2. Process according to claim 1, in which the said supporting layer is an endless belt.

3. Process according to claim 1, including the further step of applying on the said supporting layer an aluminium or plastic foil, a fabric, or a wire gauze onto which the reacting mixture is projected.

4. Process according to claim 1, including the steps of allowing said reacting mixture to react and thereby form a foam layer and then separating said foam layer from said supporting layer at a location substantially spaced from said location where said supporting layer is guided to form said cylindrically shaped section.

* * * * *